United States Patent [19]

Single, II et al.

[11] Patent Number: 4,729,600
[45] Date of Patent: Mar. 8, 1988

[54] MULTI-MODE CHILD RESTRAINT SYSTEM

[75] Inventors: Arthur W. Single, II, Plymouth Township, Plymouth County; Thomas J. Bryans, Canton, both of Mich.

[73] Assignee: Ford Motor Company, Dearborn, Mich.

[21] Appl. No.: 685,691

[22] Filed: Dec. 24, 1984

[51] Int. Cl.$^4$ .................................................. A47C 1/08
[52] U.S. Cl. ................................... 297/250; 297/328; 297/377; 297/488
[58] Field of Search ............... 297/487, 488, 250, 257, 297/377, 313, 328, 154

[56] References Cited

U.S. PATENT DOCUMENTS

| | | | |
|---|---|---|---|
| 3,232,665 | 2/1966 | Von Wimmersperg . | |
| 3,404,917 | 10/1968 | Smith | 297/257 X |
| 3,409,325 | 11/1968 | Hamilton et al. | 297/377 |
| 3,424,497 | 1/1969 | Brilmyer et al. . | |
| 3,492,047 | 1/1970 | Dudouyt | 297/377 |
| 3,572,827 | 3/1971 | Merelis | 297/328 X |
| 3,583,761 | 6/1971 | Hume | 297/488 X |
| 3,596,986 | 8/1971 | Ragsdale . | |
| 3,722,951 | 3/1973 | Ezquerra | 297/488 |
| 3,791,694 | 2/1974 | Roberts et al. . | |
| 3,794,379 | 2/1974 | Furey | 297/250 |
| 3,934,934 | 1/1976 | Farrell, Jr. et al. . | |
| 3,976,328 | 8/1976 | Stahel | 297/377 |
| 4,047,755 | 9/1977 | McDonald et al. . | |
| 4,155,591 | 5/1979 | Mauron . | |
| 4,186,962 | 2/1980 | Meeker . | |
| 4,205,877 | 6/1980 | Ettridge . | |
| 4,231,612 | 11/1980 | Meeker . | |
| 4,342,483 | 8/1982 | Takada | 297/488 |
| 4,345,791 | 8/1982 | Bryans et al. . | |
| 4,456,302 | 6/1984 | Knoedler et al. | 297/488 |
| 4,500,133 | 2/1985 | Nakao et al. | 297/250 X |

Primary Examiner—Peter A. Aschenbrenner
Assistant Examiner—Thomas A. Rendos
Attorney, Agent, or Firm—Peter D. McDermott; Roger L. May

[57] ABSTRACT

A multi-mode child restraint system is disclosed, comprising a seat and a bolster adapted to receive and releasably engage the seat. The seat provides a seating unit and an impact shield pivotally mounted to the seating unit. The impact shield is rotatable rearwardly to form a support stand for the seating unit in a reclined position. The restraint seat, either with or without the bolster is adapted to be secured to a motor vehicle seat by a seat belt associated with such motor vehicle seat.

8 Claims, 6 Drawing Figures

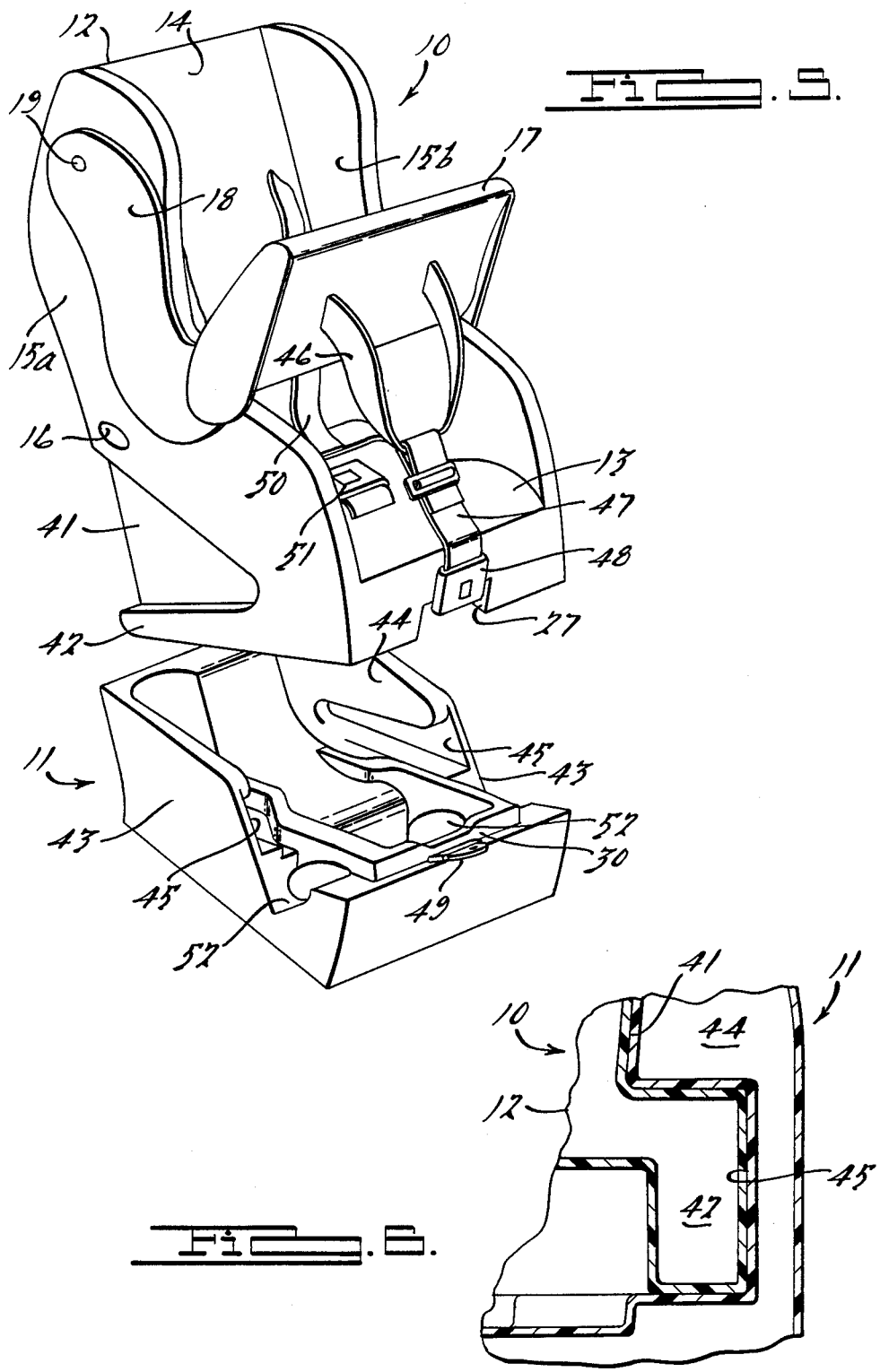

MULTI-MODE CHILD RESTRAINT SYSTEM

TECHNICAL FIELD

This invention relates to a child restraint system adapted for use on the seat of a motor vehicle in conjunction with a seat belt of the motor vehicle and adapted also for use as a free standing child seating device. More particularly, this invention relates to a child restraint seat and to a child restraint system incorporating such child restraint seat.

BACKGROUND ART

Child restraint systems for motor vehicles are well known in a diversity of shapes and designs for both child and infant use. In U.S. Pat. No. 4,345,791 to Bryans et al, a child restraint system is shown which includes a bolster adapted to be supported on a vehicle seat cushion and a child seat adapted to be supported either on the bolster or directly on the seat cushion without the bolster. According to this design, the child seat itself provides only a single seating position. That is, it provides no means for propping the child seat to a reclined position. In addition, this child restraint system provides no impact shield associated with the child seat. That is, it provides no fixture in front of the child or infant occupying the child seat.

A child car seat is shown in U.S. Pat. No. 4,186,962 to Meeker, which car seat provides a padded arm rest comprising a bar which extends laterally across the front of a child occupying the car seat. Also shown is a prop, a stand pivotably mounted to the bottom rearward area of the the seat. The devices shown in U.S. Pat. No. 3,596,986 to Ragsdale and U.S. Pat. No. 3,791,694 to Roberts et al. each is designed for use in only one position. The devices shown in U.S. Pat. No. 3,424,497 to Brilmyer et al. provides a shell which is held by a motor vehicle seat belt. The shell forms a tunnel or channel which receives an occupant sitting either on the vehicle seat itself or on a separate, detached bolster. The Brilmyer et al device appears useful only in a motor vehicle in conjunction with a seat belt. The seating device shown in U.S. Pat. No. 3,232,665 to Von Wimmersperg similarly discloses essentially a shell to be held by a vehicle seat belt over and in front of a child occupant. U.S. Pat. No. 3,934,934 to Farrell, Jr. et al discloses a child seating apparatus comprising an outer shell usable in either of two different positions to form either a reclining seat for an infant or an upright seat for a toddler or small child. Farrell, Jr. et al disclose a bolster to raise the height of the outer shell when used in the toddler mode. Also for the toddler mode, a shield is disclosed to cooperate with the shell to encircle the toddler's body. A two-part safety seat for a child is shown in U.S. Pat. No. 4,155,591 to Mauron. A first part defines a seating surface and at least a rear part of the side walls. The second part comprises a band or front wall and at least a front portion of the side walls. The two parts are interlocked together to encircle the child occupant.

Several child safety seats are known which incorporate a seating unit fixed to a tubular metal frame. Typically, the seating unit is mounted to the frame in such manner as to allow adjustment of the seat to one of several reclining positions. Such tubular frames are bulky and present risk of injury by pinching fingers, hands, etc. of the infant or child occupant. Exemplary such devices are shown in U.S. Pat. No. 4,205,877 to Ettridge; U.S. Pat. No. 4,231,612 to Meeker; and U.S. Pat. No. 4,047,755 to McDonald et al.

BRIEF DESCRIPTION OF THE DRAWINGS

The invention will be more clearly understood from the following description taken in conjunction with the drawings, wherein:

FIG. 5 is a perspective view of the child restraint system of FIG. 4 in exploded view, showing also a safety belt system integral with the seat and bolster; and FIG. 6 is a cross-sectional view partially broken away, taken along line VI—VI in FIG. 4 and showing the engagement of the seat to the bolster.

SUMMARY OF THE INVENTION

Figure 1:
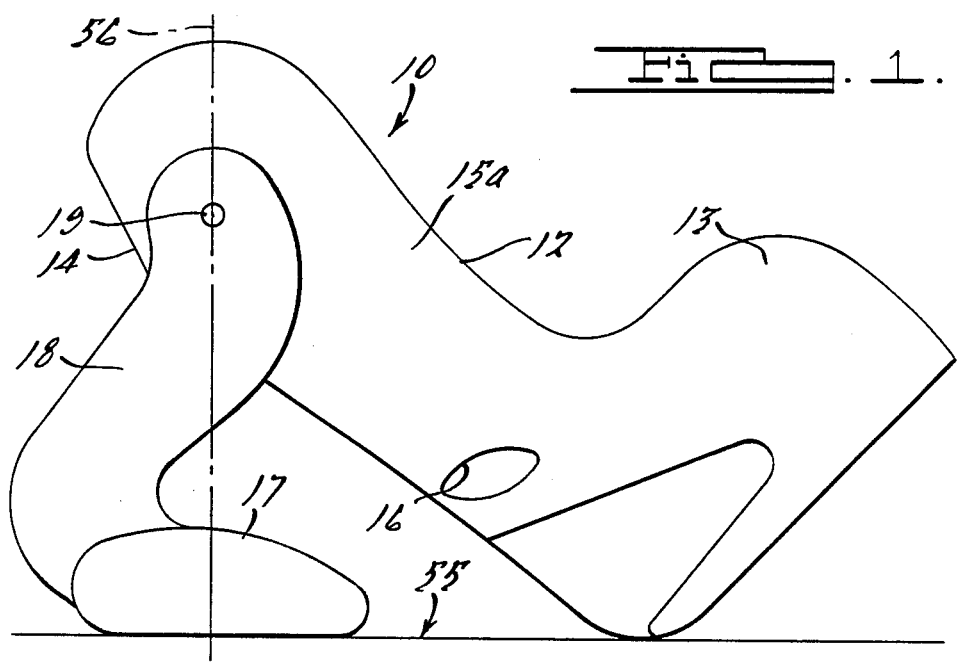
FIG. 1 is a side elevation view of a child seat according to one embodiment of the invention, shown in a rearwardly reclined position supported by the pivotably mounted impact shield.

According to the present invention, a child seat is adapted to support and restrain a child in an upright position and, alternatively, in one or more rearwardly reclined positions. The child seat is adapted to be used, for example, directly on the seating surface of a motor vehicle seat and preferably is adapted to receive a seat belt associated with such vehicle seat to be held in position on the vehicle seat cushion. The child seat of the present invention comprises:

a seating unit having a seat portion, a back portion connected to and extending upwardly from the seat portion, and a pair of laterally spaced side walls connected to and extending forwardly from the back portion, the back portion, seat portion and side walls each being unitary with the others; and an impact shield comprising a shield portion and a mounting arm integral with the shield portion, the mounting arm being pivotally mounted to the seating unit, the impact shield being adapted to rotate to a forward position to present a substantially planer inclined surface spaced forwardly of the back portion of the seating unit, the impact shield also being adapted to rotate to a rearward position behind the back portion to support the seating unit in a rearwardly reclined position.

It is a significant characterizing aspect of the invention that the impact shield cooperates with the seating unit to enclose the occupancy area of the child seat and is adapted to rotate to a rearward position behind the back portion, in which position the impact shield and the bottom rear portion of the seating unit cooperate to support the child seat in a stable, rearwardly reclined position.

The child seat of the present invention preferably further comprises means for propping itself in a position which is rearwardly reclined to a lesser degree than that achieved using the impact shield as a rear support. Such means for propping the child seat is pivotally mounted under the seating surface of the child restraint seat within a cavity formed in the bottom of the aforesaid seat portion of the seating unit. The propping means is adapted to be releasably engaged in a first position substantially entirely within such cavity in the seat portion. The propping means can be released and its forward edge rotated downwardly. It then is releasably engaged in a second position below the bottom of the seat portion of the seating unit. In such second position the propping means and the bottom rear portion of the seating unit cooperate to support the child seat in a reclined position.

Preferably the child seat provides a seat belt passage extending through the lower rearward portion of the seating unit. Thus, the child seat would be oriented in a forward facing direction. This mode is particularly suitable for use with toddlers and small children. Preferably, the child seat further provides means for harnessing a child within the child seat, which harness means is integrated with the seating unit and preferably also the impact shield and is adapted to restrain a child within the child seat independently of a vehicle seat belt.

According to a second aspect of the present invention, a child restraint system comprises the above-described child seat in conjunction with a bolster unit. The seat and the bolster are releasably interengageable. More specifically, the seating unit is positioned in the bolster and according to a preferred embodiment, the above-discussed propping means functions as a latch to secure the seating unit to the bolster. The bolster is adapted to receive a seat belt associated with a vehicle car seat, whereby the bolster can be secured to the vehicle seat. The seating unit can be engaged and disengaged from the bolster while the bolster remains secured to the vehicle seat. The seat belt passage through the bolster preferably is provided in the forward portion thereof such that the child restraint seat faces rearwardly in the vehicle when used in conjunction with the bolster. This mode is particularly suitable for use with infants and toddlers.

DESCRIPTION OF PREFERRED EMBODIMENTS

The child restraint system of the present invention is adapted to be supported on a seat cushion of a motor vehicle in any of two or more different positions. The child restraint system also is adapted for use outside a motor vehicle. The child restraint system comprises a seating unit, which can be used alone in a child seating mode, and a bolster adapted to releasably engage the seating unit in an infant carrying mode. The seat alone, without the bolster, is adapted to be supported on a vehicle seat cushion in a forward facing direction in a first position, wherein the means for propping the child seat rearwardly is retracted to within a cavity formed by the seat portion of the child seat, or in a second position, wherein such means for propping the child seat is extended such that the child seat is in a more reclined position. In either of these positions the child seat is adapted to be secured by the lap belt associated with the vehice seat. The child seat also is usable in either of these two positions on surfaces outside a motor vehicle. In addition, the child seat can be used in conjunction with the bolster and in this mode is adapted to be supported in a rearwardly facing direction on the seat cushion of a motor vehicle and, again, to be secured thereon by the seat belt associated with the vehicle seat. This configuration of the child restraint system of the invention is particularly suitable for use with infants. In this mode, the bolster can be left secured to the vehicle seat while the seat portion with its infant or child occupant is disengaged from the bolster and carried from the vehicle. The child seat is useful in yet another position, specifically, in a further reclined position. In this position the impact shield is rotated up and away from in front of the occupant to behind the seating unit to form a support for the child seat. A child seat according to the invention in such rearwardly reclined mode is shown in FIG. 1.

Turning now more specifically to the drawings, a child seat 10 is shown both alone and in conjunction with a bolster 11. The child seat has a seating unit 12 having a seat portion 13, a back portion 14 and side walls 15a,15b, each integral with the others and most preferably unitary therewith. Seat belt passage 16 extends through the seating unit intermediate the back portion and the seat portion. This passage is adapted to receive a seat belt associated with a motor vehicle seat to secure the child seat in a forward facing position on the vehicle seat.

Figure 4:
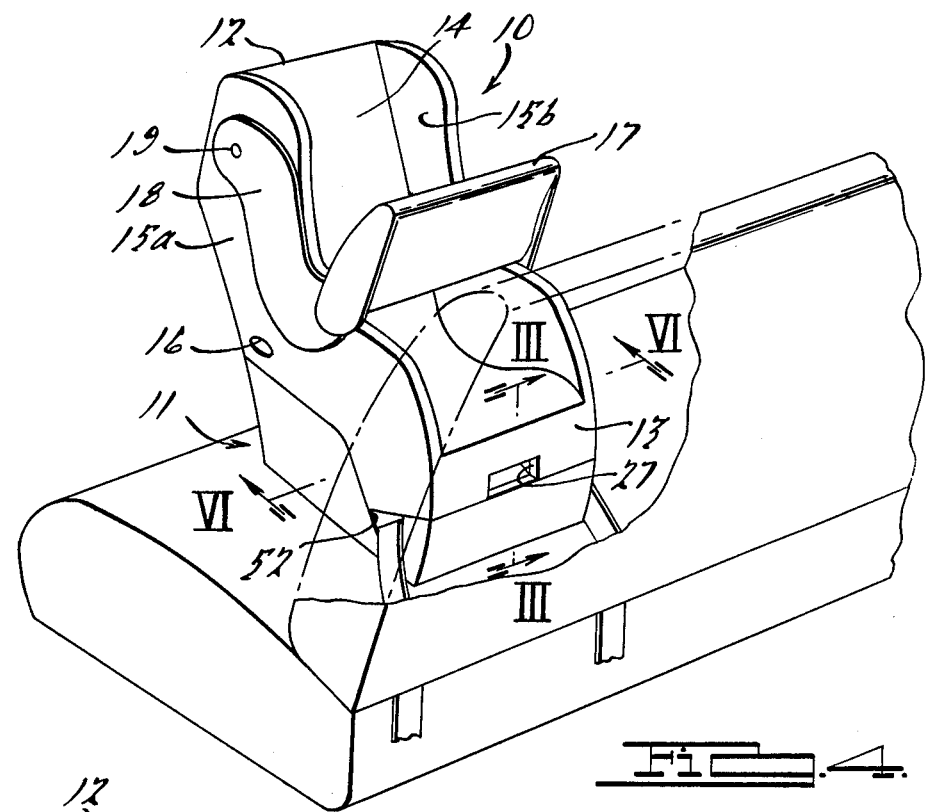
FIG. 4 is a perspective view of the child restraint system of the invention comprising the child seat of FIG. 1 in conjunction with a bolster, the seat and bolster being secured in position on a motor vehicle seat by a lap belt associated with the vehicle seat.
Figure 2:
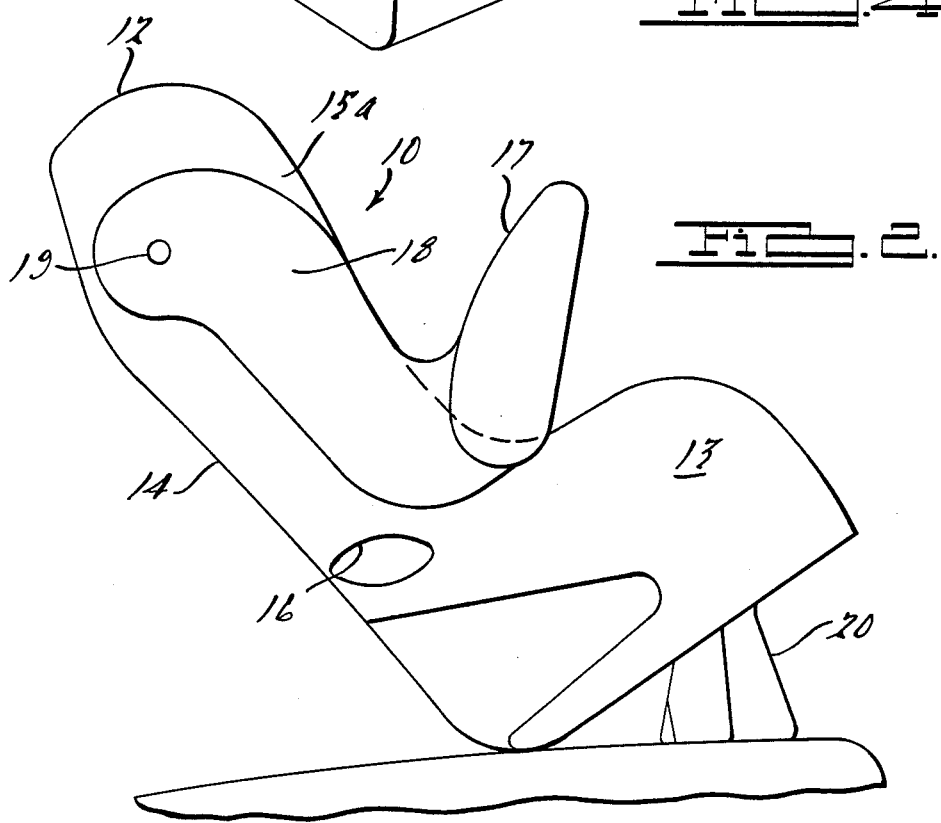
FIG. 2 is a side elevation view of the child seat of FIG. 1 shown in an intermediate reclined position supported by prop means extending downwardly from a cavity defined by seat portion of the child seat.

Impact shield 17 is rotatably mounted via arm 18 at pin 19 to the right or left side of the seating unit. Preferably, the impact shield 17 is mounted via a pair of parallel arms, one to each side wall of the seating unit. As seen in FIGS. 2, 4 and 5, the impact shield is designed to cooperate with the seating unit 12 to enclose the child or infant occupying the chid seat. In the event of a collision the child would be presented with the relatively broad surface of the impact shield against which to dissipate the energy of impact. As seen in FIG. 1, the impact shield is adapted to be rotated about pin 19 rearwardly to support the child seat in a rearwardly reclined position. In the preferred embodiment shown in FIG. 1 the impact shield is seen to present downwardly a flat surface which, in conjunction with the bottom lower portion of the seating unit, provides stable support for the child seat in this rearwardly reclined position. The impact shield is stopped from rotating further forward by contact with one or both side walls or the seat portion of the seating unit. Of course, when the child seat is rearwardly reclined, with the impact shield rotated back to form a support leg, the position of the impact shield must be sufficiently fixed (both rotationally and laterally) to provide good stability. Thus, suitable means can be provided to releasably lock the position of the impact shield. According to one preferred embodiment which provides good stability when the child seat is rearwardly reclined with the impact shield rotated rearly to act as a supporting leg, the impact shield provides a large area of contact with the supporting surface under the child seat. More specifically, it spans an area of contact with the supporting surface which extends both forward and rearward of the point of intersection of a vertical line dropped from the pivot point of the mounting arm of the impact shield to the support surface. This can be seen in FIG. 1, for example, wherein the impact shield contacts support surface 55 both forward and rearward of vertical line 56.

Figure 3:
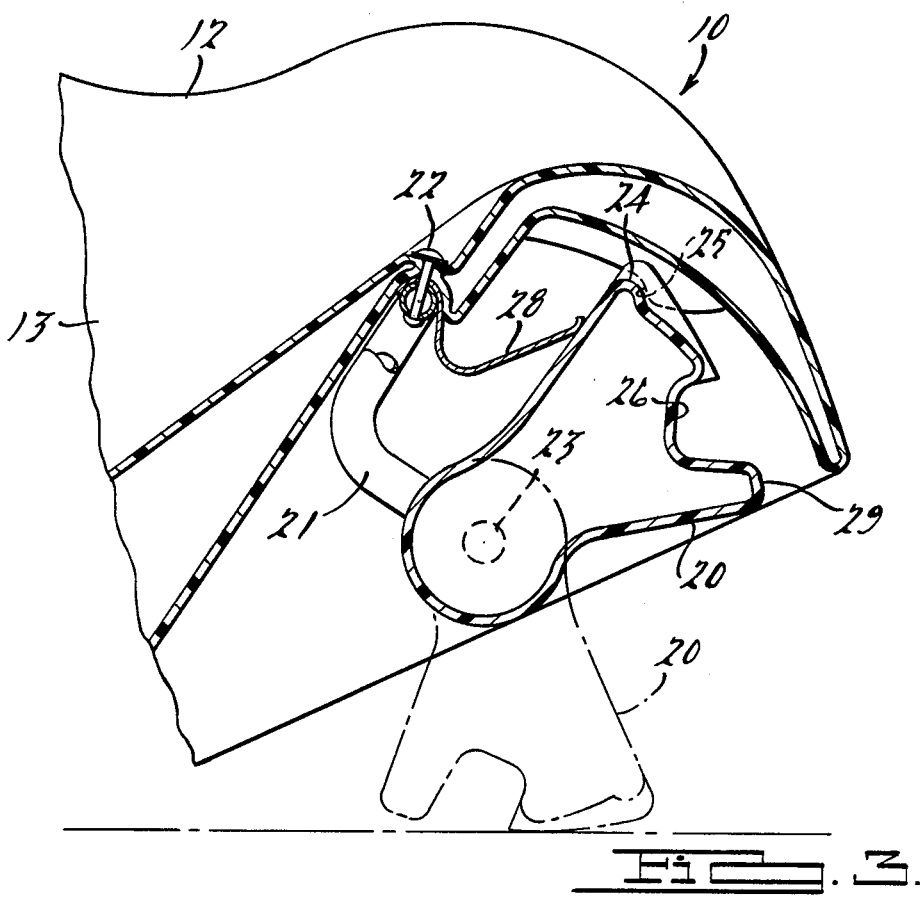
FIG. 3 is a partial side elevation view taken along line III—III in FIG. 4, in cross-section, of the seat portion of the child seat, showing the cavity defined by the seat portion and the prop means (a) retracted into such cavity and (b) (in phantom) extended to support the child restraint seat in a reclined position.

FIG. 3 discloses a preferred embodiment in which the child seat comprises means for propping itself in a rearwardly reclined position (which position is less rearwardly reclined than that achieved through use of an impact shield as a rear support.) FIG. 2 illustrates the child seat in such rearwardly propped position. It can be seen that in this mode the propping means presents downwardly a substantially flat surface which, in conjunction with the bottom rear portion of the seating unit, provides stable support for the child seat to be in this rearwardly reclined position. FIG. 3 shows the propping means in cross-section taken through a vertical plane III—III in FIG. 4 (bolster not shown), in which prop 20 is shown retracted into the seat portion of the seating unit and (in phantom) in the downwardly extended position. Prop 20 is pivotally mounted within a cavity provided within the seat portion 13 of the seating unit via bent tubular member 21. Tubular member 21 extends laterally within the cavity and is bent downwardly for attachment to the prop 20 at the right and left side thereof. Thus, mounting tube 21 is essentially U-shaped but, as seen in FIG. 3, the downwardly extending ends of the tube (extending from the prop to the laterally extending section of the tube) can be bent to facilitate mounting and supporting the prop within the seating unit. The mounting tube 21 is shown to be secured to the seating unit by one or more pins 22 extending through the laterally extending portion of tube and through walls of the seating unit. The mounting tube can be attached to the prop by any suitable means such as by lateral extension of the tube into a pocket bearing 23 in the prop.

The prop can be retained in the retracted position within the cavity in the seating unit by any of numerous methods which will be apparent to those skilled in the art in view of the present disclosure. Thus, for example, one means which is preferred in view of its relative simplicity and ease of use comprises a surface convexity on the prop and a corresponding surface convexity on a surface of the seating unit within the cavity. The prop surface convexity is adapted to be positioned above and to rest against the corresponding seating unit convexity, whereby the prop is held in position in the cavity. The convexities are adapted, however, to pass over each other to release the prop. That is, the prop or its mounting will yield such that the prop surface convexity can pass over the seating unit convexity as the prop is moved into the downward position. Similarly, the prop surface convexity can be passed over the seating unit convexity upon application to the prop of upward force to return it to its position within the cavity within the seating unit. The force necessary to move the convexities past each other is greater than that of gravity or that likely to be experienced by the prop due to movement of the child seat in normal use. According to the preferred embodiment shown in FIG. 3, bump or rib 24 is provided in the upper forward edge of at least a central section of the prop and a corresponding bump or rib 25 is provided in an internal wall of the seating unit against which the prop abuts when in its retracted position. Thus, the prop is rotated upward into the seat portion of the seating unit and the mounting system yields somewhat to allow the ribs 24 and 25 to pass each other. For extending the prop downwardly to the propping position, preferably a large detent 26 is provided in the forward facing surface of the prop and access opening 27 is provided in the lower front wall of the seating unit to provide access to the detent 26 such that the prop can be forced downwardly.

According to one embodiment of the present invention, the above-described child seat is employed together with a bolster 11, particularly for use as an infant carrying seat. As seen in FIGS. 4, 5 and 6, the bolster releasaby engages the seating unit at the bottom of the seating unit via corresponding tongue and groove means. That is, each side of the seating unit provides a groove 41 and a tongue 42. The inner surfaces of the vertical side walls 43 of the bolster provide corresponding tongues 44 and grooves 45, respectively. Thus, it can be understood that the seating unit is positioned in front of the bolster and then slid rearwardly into the bolster.

Preferably the seating unit is secured to the bolster by means of a belt arrangement as shown in FIG. 5. Specifically, belt loop 46 is securely fastened to the impact shield and belt 47 carrying buckle 48 (such as presently are well known for use in motor vehicle seat belts) is attached to loop 46. A belt securely attached to the bolster carries tongue 49 which is adapted to be inserted into buckle 48 to secure the seating unit to the bolster. Tongue 49 can be released from buckle 48 to separate the seating unit from the bolster.

According to one preferred embodiment, the prop serves as a latch for holding the seating unit in the bolster as an alternative to or, more preferably, in addition to the aforesaid belt system. Thus, for example, the prop can be spring biased such that when the seating unit is inserted into the bolster unit, the prop is urged into a position behind an abutment wall of the bolster unit. The access opening 27 in the center of the lower front face of the seat portion of the seating unit can be provided to allow access to the prop such that it can be forced upwardly from behind the abutment wall of the bolster, whereupon the seating unit can be separated from the bolster. Referring to the embodiment of FIGS. 3 and 5, spring 28 is provided to bias the prop downwardly such that surface section 29 of the prop remains in abutting engagement with the inside surface of wall 30 of the bolster. The seating unit is disengaged from the bolster by lifting the prop upwardly and then sliding the seating unit forward. As seen in FIG. 4, the prop can be reached for this purpose through access opening 27. That is, removal of the seating unit from the bolster can be effected by manually overriding the spring bias provided by spring 28 to clear the prop from behind wall 30 of the bolster. This can be done by inserting the hand at access opening 27 and pressing the prop upwardly. When the prop has cleared wall 30 of the bolster, the seating unit can be pulled forwardly out of the bolster.

Preferably the seating unit also provides a belt restraining means as shown in FIG. 5 for restraining the child or infant therein. Thus, for example, belt 50 is shown with buckle and tongue means 51 such that the restraining belt can be engaged to restrain the child in the seating unit and disengaged to release the child therefrom.

Passage 52 is adapted to receive the seat belt associated with a vehicle seat upon which the child restraint system is to be secured. As seen in FIG. 4, seat belt passage 52 is provided in the forward portion of the bolster such that when secured to a vehicle seat, the seating unit faces rearwardly. This mode is particularly well suited for use as a restraint seat for infants.

The seating unit and bolster of the present invention can be made by various methods well known to the skilled of the art. Thus, for example, the seating unit can be molded of a single, integral plastic body. The impact shield (including mounting arms), prop and the bolster can be formed by well known molding processes, such as injection molding, blow molding, etc. Suitable materials for making the child seat and bolster include, for example, high impact plastics and the like.

INDUSTRIAL APPLICABILITY

In view of the foregoing disclosure, it will be apparent that the present invention provides a child restraint system which can be used as a safety device in a motor vehicle and can be used outside a motor vehicle in a reclining or non-reclining position. It is to be understood that this invention is not limited to the exact construction illustrated and described above, but rather that various changes and modifications may be made without departing from the scope of the invention as defined in the appended claims.

We claim:

1. A child restraint system comprising
(A) a child seat comprising:
a seating unit having a seat portion, a back portion extending upwardly from said seat portion, and a pair of side walls extending forwardly from said back portion, said back portion, seat portion and side walls each being unitary with the others; and
an impact shield comprising a shield portion and a mounting arm integral with said shield portion, said mounting arm being pivotably mounted to said seating unit, said impact shield being pivotable to a forward position to present a substantially planar inclined surface spaced forwardly of said back portion of the seating unit, said impact shield also being pivotable to a rearward position behind said back portion to support the seating unit in a rearwardly reclined position;
(B) a bolster means for supporting said child seat, which bolster means is releasably engagable with said child seat; and
(C) means for propping said seating unit in a reclined position, said means comprising a prop pivotably mounted under the seating surface of said seating unit within a concavity defined by said seat portion thereof, said prop being releasably engagable in a first position substantially entirely within said concavity and releasably engagable in a second position extending below the bottom of said seat portion in such location that said propping means and the bottom rear portion of said seating unit together support said seating unit in a rearwardly reclined position, wherein said prop releasably engages the seating unit to the bolster, said prop being spring biased downwardly into such abutment with said bolster.

2. The child restraint system according to claim 1, wherein said child seat further comprises means for harnessing a child within the child seat, which harness means comprise a belt system integral with said seating unit for restraining a child occupying the child restraint seat.

3. The child restraint system according to claim 1, wherein a passage extends through said seating unit approximately intermediate said back portion and said seat portion, a seat belt associated with a motor vehicle seat being receivable by said passage to secure the child seat motor vehicle seat.

4. The child restraint system according to claim 1, wherein said impact shield, in the rearward position, spans an area of contact with the supporting surface under the child seat, which area extends both forward and rearward of a vertical line from the support surface to the point at which said mounting arm is mounted to said seating unit.

5. The child restraint system according to claim 1, wherein said bolster comprises integral vertical side walls having a tongue and groove configuration and said seating unit has lower rearward outer side surfaces having a tongue and groove configuration adapted to register with said tongue and groove configuration of the bolster, whereby said seating unit can be inserted into said bolster to be engaged therewith in fixed relative position.

6. The child restraint system of claim 1, further comprising means for releasably retaining said prop within said concavity in said seating unit against the force of gravity, said retaining means comprising a surface convexity on said prop and a convexity on a surface of said seating unit within said cavity, said prop surface convexity being positionable above, to rest against, said seating unit surface convexity when said prop is being retained within said concavity, said prop surface convexity being passable over said seating unit convexity upwardly and downwardly upon application to the prop of upward and downward force, respectively.

7. The child restraint system of claim 1, wherein said means for engagement of the bolster with the child seat comprises a belt attached to the bolster and a second belt attached to the child seat, said belt and said second belt having means releasably interengageable with each other.

8. The child restraint system according to claim 1 wherein said bolster is securable to a vehicle seat by a seat belt associated with said vehicle seat, said bolster having a passage extending laterally through a forward portion thereof, through which passage said seat belt may be passed.

* * * * *